United States Patent [19]

Payne et al.

[11] 4,081,729
[45] Mar. 28, 1978

[54] LOW VOLTAGE PHOTOSWITCH

[76] Inventors: Larry E. Payne, 3224 Wesley Chapel Rd., Decatur, Ga. 30034; Kenneth D. Lancaster, Jr., 965 Clubhouse Cir., Decatur, Ga. 30032

[21] Appl. No.: 707,383

[22] Filed: Jul. 21, 1976

[51] Int. Cl.² ............................................. H02P 7/74
[52] U.S. Cl. ..................................... 318/480; 361/176
[58] Field of Search ........................ 46/256; 318/480; 317/176, 177, 173; 361/176

[56] References Cited

U.S. PATENT DOCUMENTS

| | | | |
|---|---|---|---|
| 2,289,242 | 7/1942 | Chance et al. | 361/176 |
| 2,424,193 | 7/1947 | Rost et al. | 318/480 |
| 3,144,598 | 8/1964 | Merritt | 318/480 |
| 3,160,757 | 12/1964 | McAllise | 361/176 |
| 3,621,356 | 11/1971 | On | 318/480 |

Primary Examiner—David Smith, Jr.
Attorney, Agent, or Firm—Newton, Hopkins & Ormsby

[57] ABSTRACT

A light responsive toy comprising a housing, such as in the form of a mechanical robot, which has a first photocell that is connected to the relay of a double polarity motor which is geared to suitable means to drive the toy along a first path when light from a hand-held source, such as a flashlight, is incident upon the first photocell. A second photocell is on the housing and is operatively connected to the motor through a double throw, double pole switch to reverse the direction of the toy along a second path when light is incident upon the second photocell.

3 Claims, 3 Drawing Figures

U.S. Patent  March 28, 1978  4,081,729
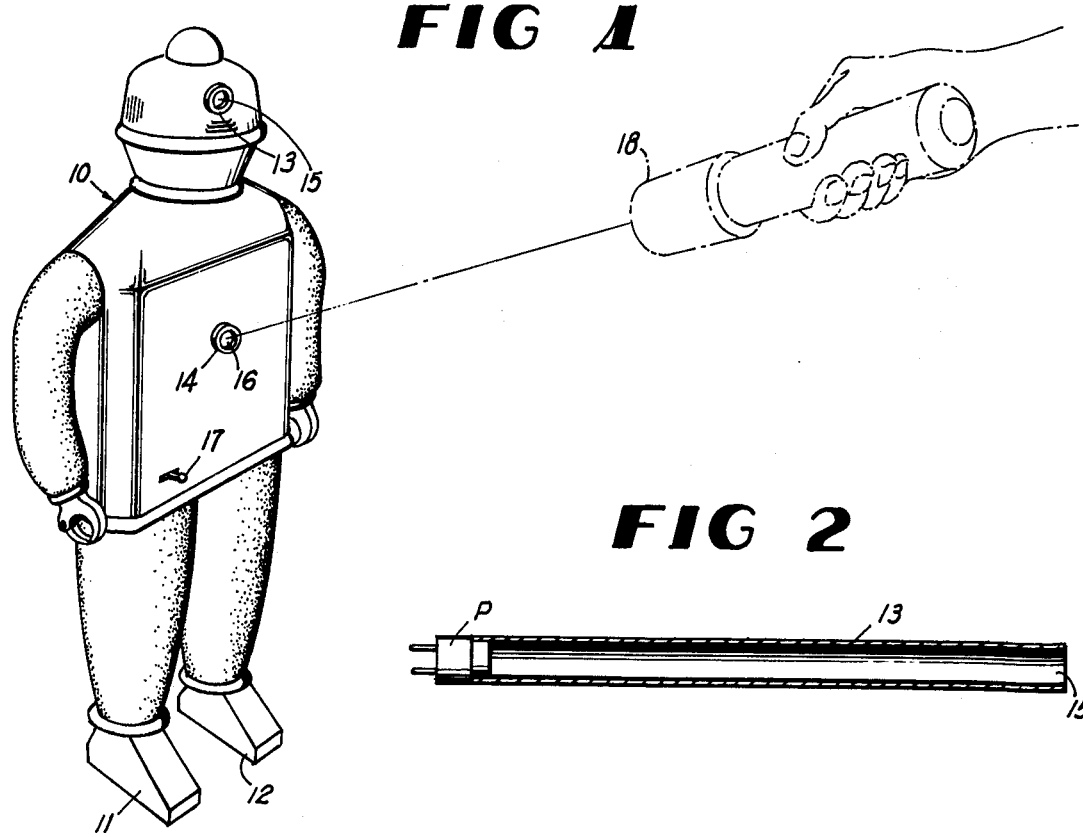
FIG 1
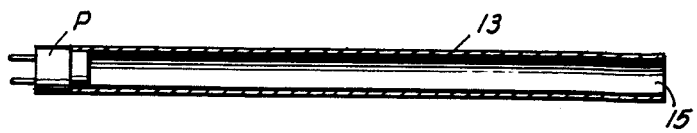
FIG 2
FIG 3
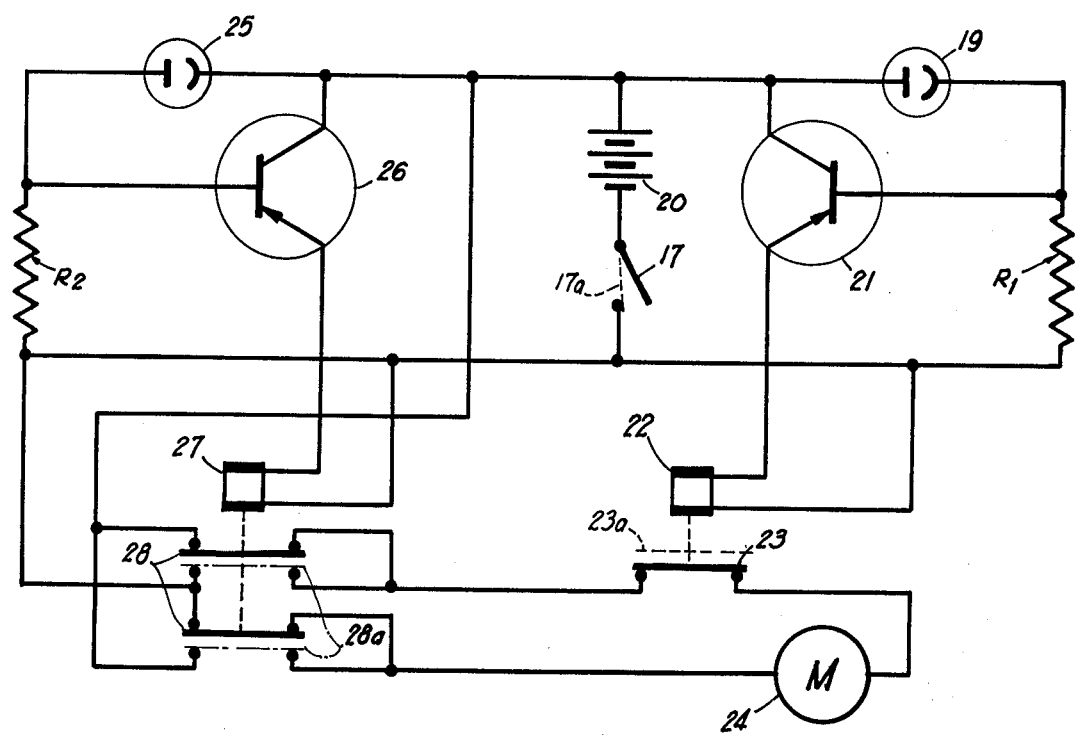

LOW VOLTAGE PHOTOSWITCH

BACKGROUND OF THE INVENTION

1. Field of the Invention

This invention relates to amusement devices, and more particularly, to light responsive toys.

2. Description of Prior Art

Many prior devices have been constructed which utilize light responsive elements for amusement purposes. Some of those devices have included light guns which are aimed at light responsive targets. Cooper et al., U.S. Pat. No. 2,922,929, shows a toy vehicle motor circuit with sequential operation of motor relays activated by a light responsive element to ultimately reverse the direction of the motor.

Others of those toys include driven vehicles, the direction of which is controlled by at least two light sensitive means which energize respective motors, depending upon which one of the light sensitive means is activated. Such a device is shown in the patent to Wiggins, U.S. Pat. No. 3,130,803.

The Carroll device, U.S. Pat. No. 3,314,189, utilizes light sources of different wave lengths provided by different filters.

One of the disadvantages with the prior art devices was their utilization, in some instances, of two or more separate motors to drive the devices in different directions. A drawback to all of those devices was their utilization of unreliable, complicated and cumbersome electrical circuits.

SUMMARY OF THE INVENTION

The above disadvantages are overcome by the present invention which comprises a light responsive toy having a circuit which controls the motion of the toy and which is selectively actuated by a beam of light. The toy includes a housing, such as in the shape of a robot, having only one reversible motor which is geared to wheels or tracks by appropriate gear reduction means to supply power to drive the toy either in a first direction or a second direction which is opposite to the first direction. The circuit includes a battery power supply which is manually actuated by a switch which is externally located on the toy. A control photoconductor is connected to the power supply and then through a transistor to a first relay for turning the motor off and on. The toy is also provided with a directional photoconductor which is connected to the power supply and through a transistor to a second relay which operates a double throw, double pole switch connected to the motor.

To operate the toy, the external switch is placed in its on position. Light from a hand-held source, such as a flashlight, is first directed upon the control photoconductor which energizes the first relay to operate the motor and drive the toy in a first direction. To reverse the direction of movement of the toy, the light source is aimed at the directional photoconductor which energizes the second relay to reverse the motor through the double throw, double pole switch, thereby reversing the movement of the toy.

An object of the present invention is to provide an improved light-actuated circuit for controlling the operation of a motor.

Another object of the present invention is to provide a light responsive electrical circuit which is inexpensive, compact and easy to operate.

BRIEF DESCRIPTION OF THE DRAWING

FIG. 1 is a perspective view of a toy employing the present invention;

FIG. 2 is a cross-sectional side view of the housing for a photoconductor utilizing the present invention; and FIG. 3 is a schematic of the electrical circuitry of the present invention.

DESCRIPTION OF THE PREFERRED EMBODIMENT

FIG. 1 denotes generally a housing employing the present invention, the housing being a mechanical robot 10 which is capable of movement along a horizontal surface by means of feet 11, 12. It is, of course, understood that the circuit of the present invention can be operatively included within any suitably shaped maneuverable toy, such as a car.

Small cylindrical tubes 13, 14 have their respective ends protrude through the chest area of the robot 10. The tubes form openings 15, 16 respectively. As seen in FIG. 2, a photoconductor P is mounted by any suitable means at the end of the tube 13 opposite opening 15. The tubes 13, 14 can be constructed of any suitable material, such as aluminum or cardboard. The inside of the tubes 13, 14 are painted with a flat black paint to eliminate glare along their lengths. The photoconductors P are mounted at the end of the tubes 13, 14 to prevent any extraneous light from impinging upon the photoconductors P.

A switch 17 is provided through the body of the robot 10 and is manually moveable between on and off positions.

A manually operative light source, such as a hand-held flashlight 18, is provided to selectively beam a ray of light at the respective openings 15, 16. The tubes 13, 14 are sufficiently spaced apart upon the robot 10 such that light from source 18 would only impinge upon one of the openings 15, 16 at any one time.

The transistorized circuit for the robot 10 is shown in FIG. 3 and comprises a control photoconductor 19 in line with a voltage source 20, such as 4 "D" size flashlight batteries, which are controlled by switch 17. A PNP transistor 21 amplifies a signal to SPDT ratchet-type relay 22 which controls switch 23 to turn the motor 24 on and off when switch 23 is in the 23a position as shown. The motor 24 has a double polarity and is thus capable of reversible operation. The photoconductor 19 is a cadmium sulfide photocell and is mounted at one end of the tube 13, as shown for photoconductor P in FIG. 2.

The circuit also includes a directional photoconductor 25 which, through PNP transistor 26 is connected to reversing relay 27 which energizes double pole, double throw switch 28 which is connected to motor 24.

The transistors 21, 26 have respective resistors $R_1$, $R_2$ which can either be of the fixed type, as shown, or can be the variable type.

To operate the robot 10, the switch 17 is placed in its on position which is shown in broken lines in FIG. 3 as 17a. Light source 18 is then aimed at opening 15 so that light impinges momentarily upon photoconductor 19, which changes its resistance so as to permit current from power source 20 to flow to the base of transistor 21. The signal is then amplified through transistor 21 to energize relay 22. Switch 23 is then closed to operate motor 24. Motor 24, which is geared through appropriate propelling means to feet 11, 12, supplies the power to drive the robot 10 in a first direction along the horizontal surface.

When it is desired to change the direction of the movement of the robot 10, such as when it is approaching an obstacle, the light source 18 is aimed at opening 16 so that light then momentarily impinges upon photoconductor 25 which, through transistor 26, energizes reversing relay 27 to throw switch 28 into its alternate position as shown in 28a. The activation of switch 28 to its position as shown in 28a reverses the operation of the motor 24 to cause feet 11, 12 to then be propelled in a second direction along the horizontal surface which is opposite to the first direction.

If the light source 18 is again shown upon photoconductor 25, the switch 28a will be thrown to its position as shown in solid lines as 28, thereby reversing the operation of motor 24 to drive feet 11, 12 in the first direction again. When it is desired to cease operation of robot 10, the light source is again shown upon photoconductor 19, thereby throwing ratchet relay 22 to its off position as shown by broken lines 23a. The switch 17 is moved to its off position in order to prevent accidental battery drain and further action.

The required operating voltage for each relay 22, 27 should be less than the total output of voltage source 20. That allows for the optimum and positive operation of each relay 22, 27.

As can be seen, the few components which are incorporated in the applicants' circuit require very little space within robot 10, even though they may be mounted on a printed circuit board. That increases the economical advantage of applicants' invention.

The applicants' invention also has a number of other uses, including the opening and closing of drapes in a home and the on-off operation of room lighting, environmental or climate controlling devices and home entertainment devices, such as stereo systems. These additional functions would be particularly useful to invalids confined to a bed or a wheelchair.

What I claim is:

1. A circuit for actuating a bi-directional motor to propel an element alternatively in a first direction and a second direction which is opposite from the first direction, comprising:
    a. a power supply connected to said motor;
    b. first switch means to cycle said power supply on and off;
    c. a first light responsive means, adapted to receive first light signals, located in a first elongated light directing tubular member in said circuit and connected to said power supply;
    d. a double acting relay operatively connected to said first light responsive means and being operable to alternately start and stop said motor in response to successive first light signals;
    e. second switch means in said circuit operatively connected to said motor and said power supply, said switch means including first direction and second direction contacts and a switch element moveable between said contacts,
    f. a second light responsive means adapted to receive second light signals, located in a second elongated light directing tubular member, in said circuit and connected to said power supply; and
    g. a reversing relay operatively connected to said switch element and being operable in response to said second light signals received by said second light responsive means to move said switch element alternately between said first and said second direction contacts to operate said motor respectively in said first and second direction.

2. A light responsive apparatus alternately movable along a forward and reverse direction, comprising:
    a. an elongated tube interiorally including a control photoconductor on said apparatus;
    b. power means on said apparatus operatively connected to said control photoconductor;
    c. manually operable switch means on said apparatus operatively connected to said power means between on and off positions;
    d. an elongated tube interiorally including a directional photoconductor on said apparatus operatively connected to said power means;
    e. DC motor means operatively connected to said control and directional photoconductors by said power means and being capable of forward and reverse operation, said power means including operatively connected first double acting relay means and first transistor circuit means coupled to said control photoconductor and being operable to control the application of power to said motor means in response to light incident on said control photoconductor, and operatively connected second double acting relay means and second transistor circuit means coupled to said directional photoconductor to selectively reverse the DC polarity of power applied to said motor means in response to light incident on said directional photoconductor; and
    f. propelling means operatively connected to said motor means to move said apparatus between said forward and reverse directions;

whereby when said switch means is manually moved to its on position, light incident upon said control photoconductor energizes said motor to operate said propelling means along said forward direction and whereby light subsequently falling upon said directional photoconductor energizes said motor to operate said gear means along said reverse direction.

3. The apparatus as claimed in claim 2 wherein said elongated tubes are diversely located with respect to one another while being pointed generally in the same direction, and wherein the respective photoconductors included interiorally therein are located at one end thereof which is opposite to the end to which light is adapted to be incident thereto.

* * * * *